W. H. H. MINGE.
Screw-Press.

No. 161,539. Patented March 30, 1875.

Witnesses:
J. B. Toulmin
N. P. Howard

Inventor.
William Henry Harrison Minge
per Morton Toulmin atty.

UNITED STATES PATENT OFFICE.

W. H. H. MINGE, OF MOBILE, ALABAMA.

IMPROVEMENT IN SCREW-PRESSES.

Specification forming part of Letters Patent No. 161,539, dated March 30, 1875; application filed March 25, 1874.

*To all whom it may concern:*

Be it known that I, WILLIAM HENRY HARRISON MINGE, of Mobile, State of Alabama, have invented a Screw of varying pitch, of which the following is a specification:

The object of this invention is to make a screw-press which shall gradually decrease in speed and increase in power, and which may be applied to many purposes for which screws are employed, but more particularly for cotton, hay, or other presses, and jack-screws, in which it is desirable to procure a quick motion, while the resistance to compression is small, and a gradual increase in power, as the material being pressed offers greater resistance, thus enabling a greater amount of work to be done in a given time with the same power.

Figure 1:
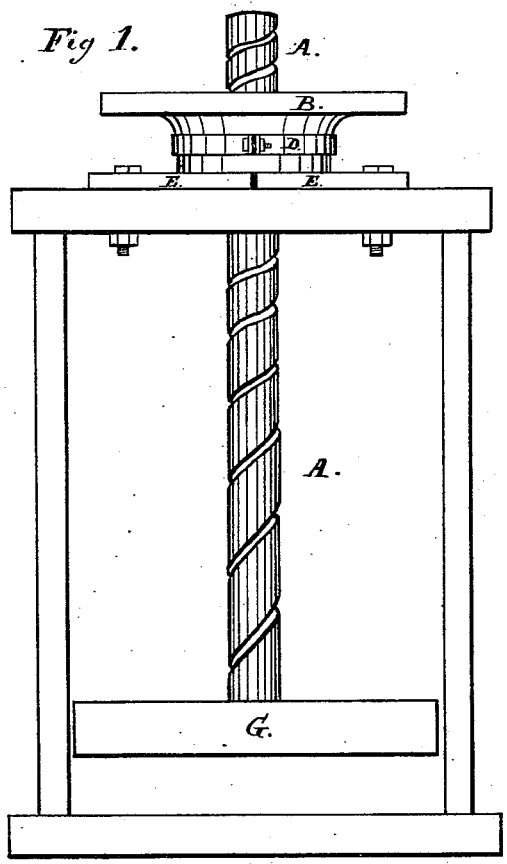
Figure 2:
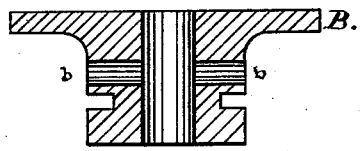
Figure 3:
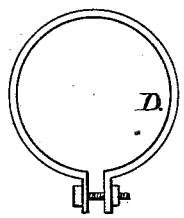
Figure 4:
Figure 5:
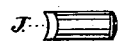
Figure 7:
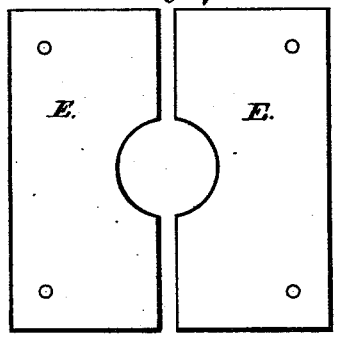
Figure 6:
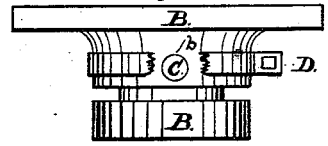

Reference being had to the drawings herewith, Figure 1 represents a side elevation of the screw, as applied to a cotton or hay press; Fig. 2, a vertical section of the nut B; Fig. 3, plan of the band D; Fig. 4, plan of screw A. Fig. 5 is a side elevation of pin C, with its projecting female thread J. Fig. 6 is a side elevation of nut B and band D, a portion of band D being broken away in order to show the outer end of pin C; Fig. 7, plan view of the collar E, in which the nut B revolves.

The letter A represents the screw of my press, the shaft of which is cut with a double thread, and with a gradual increase of pitch. B represents a nut having annular openings $b$ on its opposite sides, in which are inserted two pins, C, on the inner ends of which are projections J, which enter the grooves of the male screw A. The diameter of these pins should be about three times the width of the grooves in the male screw. To form the projections about one-third of the diameter of the pins is taken off each side of the inner ends, thus forming the threads of the female screw. These pins partly rotate in the nut B to accommodate themselves to the varying pitch of the male screw. The outer ends of the pins are made slightly convex to lessen the friction incident to the partial rotation against the band D, which holds them in place. Either the screw A or the nut B may revolve at the option of the builder. The screw and nut may be constructed of wood or metal, or of both.

I claim as my invention—

1. A screw-press, provided with a screw, A, formed with a thread of diminishing pitch, in combination with follower G, substantially for the purpose set forth.

2. In combination with a screw, A, having a thread of varying pitch, the nut B, provided with pins C, to form the female thread, substantially as set forth.

3. The screw A, in combination with the nut B, pins C, and band D, substantially as described, and for the purposes set forth.

WILLIAM HENRY HARRISON MINGE.

Witnesses:
  DICK ROPER,
  PRICE WILLIAMS.